Figure 1:
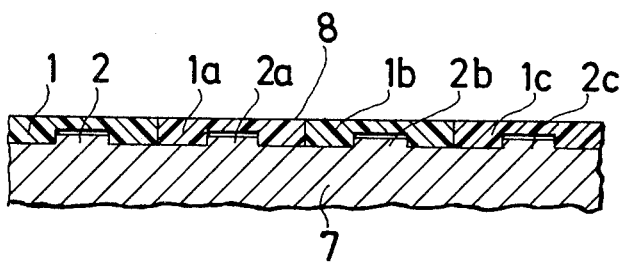

United States Patent [19]

Hunger

[11] 4,067,584

[45] Jan. 10, 1978

[54] GUIDING AND SEALING ARRANGEMENTS FOR PISTONS, PISTON RODS AND THE LIKE

[76] Inventor: Walter Hunger, Rodenbacherstr. 50, 8770 Lohr am Main, Germany

[21] Appl. No.: 589,883

[22] Filed: June 24, 1975

[30] Foreign Application Priority Data

June 26, 1974 Germany .............................. 2430573
Dec. 24, 1974 Germany .............................. 2461455
Aug. 21, 1974 Germany .............................. 282567

[51] Int. Cl.² .............................................. F16J 15/32
[52] U.S. Cl. ...................................... 277/165; 277/24
[58] Field of Search .................. 277/206, 188 A, 188, 277/24, 165

[56] References Cited

U.S. PATENT DOCUMENTS

| 2,841,429 | 7/1958 | McCuistion | 277/188 A |
| 3,774,920 | 11/1973 | Sievenpiper | 277/165 |
| 3,920,252 | 11/1975 | Dechavanne | 277/188 A |
| 3,990,712 | 11/1976 | Dechavanne | 277/165 |

FOREIGN PATENT DOCUMENTS

| 1,008,070 | 5/1957 | Germany | 277 |
| 522,024 | 6/1940 | United Kingdom | 277/165 |
| 1,100,053 | 1/1968 | United Kingdom | 277/188 A |

Primary Examiner—Robert I. Smith
Attorney, Agent, or Firm—Toren, McGeady and Stanger

[57] ABSTRACT

A guide ring having a seating surface of 'U'-shaped cross-section. A plurality of the guide rings may be carried by a piston, piston rod or the like in abutting relation to provide a continuous imperforate surface, or axially spaced from one another with a sealing member interposed between adjacent rings, the sealing member being biased into its operative position by fluid pressure. A ring of resilient material is positioned radially inwardly of the rings and sealing member and is provided with chamfered surfaces which are acted on by biasing means. A sealing arrangement is also provided comprising ring seals and/or stripper rings disposed in a groove in a piston or piston rod and formed of soft material with a lip seal in contact with a surface to be sealed. A shaped sliding ring of abrasion-resistant material which bears on the surface to be sealed is disposed in the ring seal and/or stripper ring.

15 Claims, 8 Drawing Figures

GUIDING AND SEALING ARRANGEMENTS FOR PISTONS, PISTON RODS AND THE LIKE

The invention relates to guiding and sealing arrangements for pistons, piston rods and the like. The prior art already discloses guide rings formed of plastics material which are intended for pistons and piston rods and are adapted to absorb axial operating strokes in cylinders or cylindrical guide bushes. For example, flat rings are used which are inserted into a groove so that they are not reciprocatingly entrained in the course of the axial motion. However, this system suffers from the major disadvantage that the chamber configuration forms webs on which the end-face of the guide ring bears. As a result of the large surface loading on the flat ring in the radial direction this leads to possible contact of the webs with the piston rod or the cylinder wall. When the materials are in contact this may give rise to fretting or cold-welding of the two parts which move relatively to each other.

Known guide rings also suffer from manufacturing disadvantages which are due to the fact that if a plurality of rings are arranged in series it is necessary for grooves to be cut in the pistons or guide bushes for the piston rod and such grooves must be as wide as the appropriate guide ring. Each of the said grooves must have the precise tolerance dimension in order to provide large radial support. If five or more of these grooves are arranged in series there will be tolerance errors which reduce the desired high support action of all grooves.

The known use of guide rings having a 'T'-shaped cross-section gives rise to the disadvantage that no seal can be supported by the guide members because the plastic material must be kept relatively thin because of its flow properties. If a seal is applied against the ring and is subjected to high pressure the seal will slide into the gap and the T-section will either fold or become compressed. Accordingly, the seal will be damaged and become leaky.

The prior art also discloses an adjustable sealing and guiding device for pistons and piston rods with at least two guide rings arranged in series in the axial direction and with at least one seal ring disposed therebetween and adapted to be biased by hydraulic or pneumatic pressure into its operating position (US Pat. No. 638,164). The ring seals in this case are constructed of rubber or rubberized fabric. This is resilient but on the other hand not sufficiently abrasion-resistant so that premature wear will occur.

The most diverse constructions are known in which sealing is obtained either by the pressure of the medium or by mechanical adjustability. Accordingly, chatter during operation frequently occurs in the above-mentioned resilient materials due to excessive contact pressure. Moreover, the rapid stroking motions often result in excessive temperature rise of the piston rod or cylinder surface. This frequently leads to burning of the seals which is the cause of leakage. The well known stick-slip effect is the result of seals being subjected to excessive contact pressure.

All known seals marketed for cylinder pistons and piston rods also call for a running surface which is machined to an accuracy of a few microns. This means that after wear has taken place it is necessary not only to replace the seals but the cylinder surface and the piston rod must also be re-machined. Renewal of individual components is unavoidable if substantial wear has taken place. The use of conventional seals therefore often leads to prolonged shutdown and loss of machine time.

Pure rubber seals, for example those constructed of Perbunan and the like, also suffer from the disadvantage that when subjected to pressure the rubber penetrates into the indentations of the rough surface of the cylinder tube or piston rod or into small porous areas. When the piston starts operation the seals of rubber or rubber fabric therefore suffer rapid wear. It is not always possible, more particularly in the case of long cylinders, to detect the small porous areas, especially in the case of cast cylinders and more especially if the size of the porous areas is of the order of a few microns.

The invention is based on the knowledge that the abovementioned disadvantages can be eliminated by thrusting both adjustable seal rings and guide rings of wear-resistant material against the seal surfaces. It is therefore the object of the invention to improve the device of the kind described hereinbefore in such a way that resilient material is used only for the combined biasing of the rings.

Known seals of this kind can be constructed of solid Perbunan or similar resilient materials but they can also be constructed of a fabric-perbunan mixture, the purpose of the seal lip being to strip off the pressure medium from the surface which is to be sealed. In the case of solid material this shows the disadvantage inter alia that rubbing dry-running operation in the running direction downstream of the seal lip gives rise to chatter and stick-slip effects. The construction of sharp-edged seal lips is advantageous in this case for the above-mentioned purpose but suffers from the disadvantage, more particularly in the case of combined rubber-fabric material, that the inserted and vulcanized fabric mass produces inaccuracies in the sharp-edged seal lip and that fringing due to wear or installation faults takes place relatively rapidly, more particularly on the fabric lip. This leads to leakage after a relatively short time. Furthermore, dry running leads to severe temperature rise in solid seals of rubber or plastics and this leads to destruction of the seal after a relatively short time (the seal burns).

When using the known seals it is also necessary that the running surface to be sealed is machined to an accuracy of a few microns. As a result, when wear occurs it is necessary not only to replace the seals but the cylinder surface and the piston rod must also be re-machined. As this may also be accompanied by substantial wear it will result in extensive loss of production for installation and removal of components. Pure rubber, Perbunan or plastic seals and the like also suffer from the disadvantage that as a result of pressure in operation the material enters into indentations of the rough or porous sliding surface which is to be sealed. This occurs particularly when the piston is stationary and when operation is resumed the rubber or plastics parts lodged in the indentation are sheared off so that the seal surface is unusable.

The prior art also discloses a piston-cylinder system with a multiple-part piston which enables the seal to be rapidly and simply readjusted for very high pressures at the operating location without the need for removing any parts (German patent specification 2 156 633, German Auslegeschrift 2 239 767).

Finally, the prior art also discloses a method for producing cylinder seal and guide elements for pressure media (German Offenlegungsschrift 2 324 162) by means of which the elements are injection-moulded from a polyester elastomer. Seal produced in this manner offer the important advantage of increased temperature stability accompanied by increased abrasion-resistance and improved pressure stability and hardness.

It is an object of the present invention to provide guiding and sealing arrangements which prevents metallic contact between components due to surface pressure.

Figure 2:
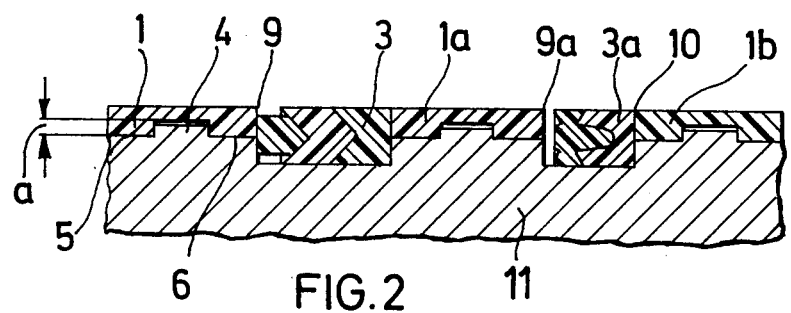
Figure 3:
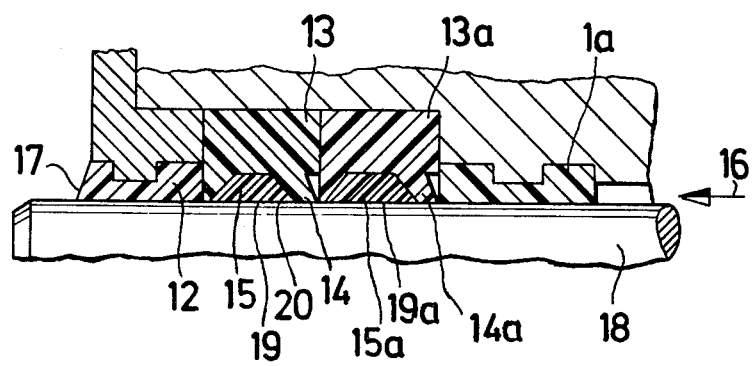
Figure 4:
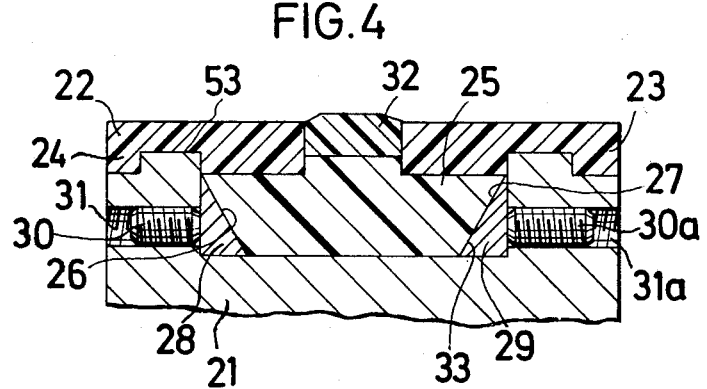
Figure 5:
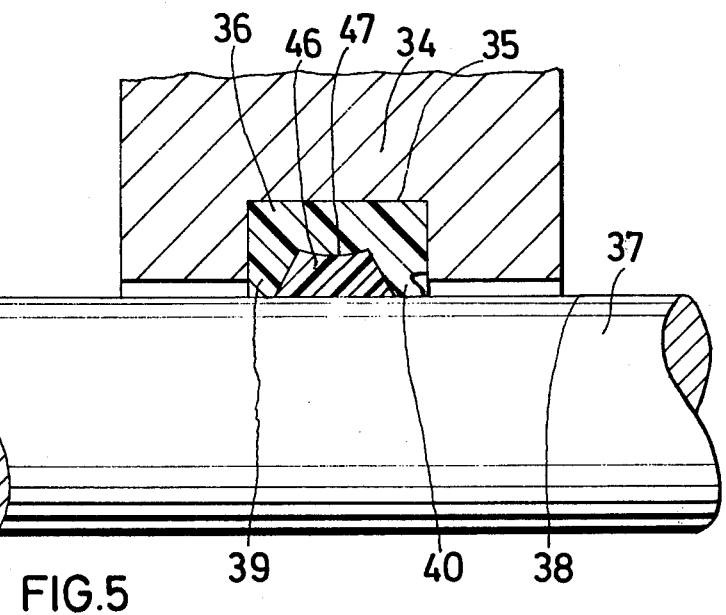
Figure 6:
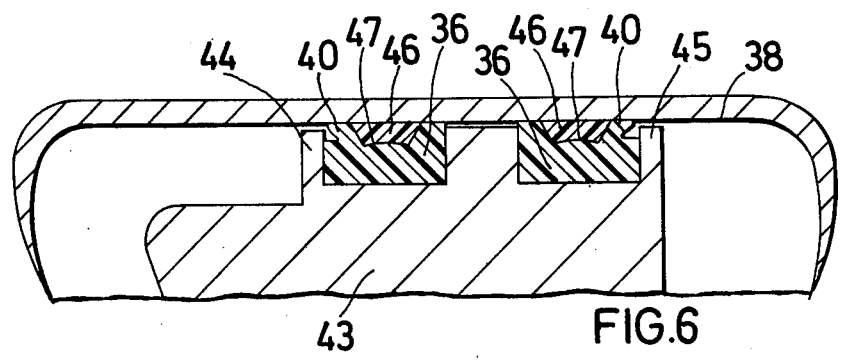
Figure 7:
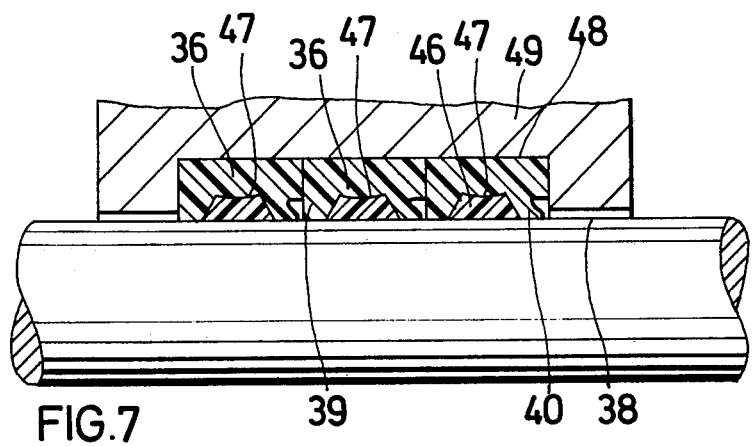
Figure 8:
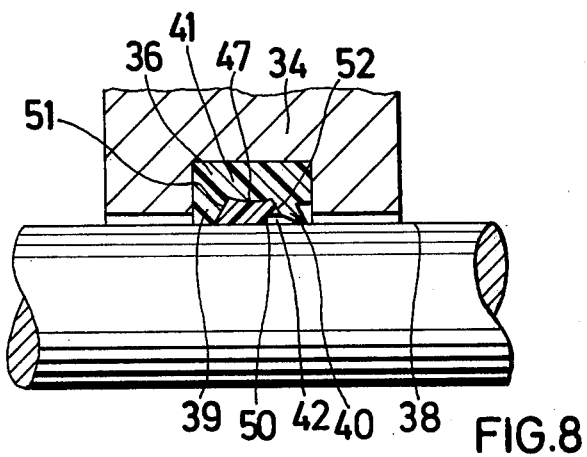

In the accompanying drawings:

FIG. 1 is a longitudinal cross-section through a piston guiding arrangement according to the present invention, FIG. 2 is a longitudinal cross-section through a piston guiding and sealing arrangement according to the present invention, FIG. 3 is a longitudinal seation through a piston rod guiding and sealing arrangement according to the present invention, FIG. 4 is a longitudinal cross-section through a further piston guiding and sealing arrangement according to the present invention, FIG. 5 is a longitudinal cross-section through a piston rod sealing arrangement according to the present invention, FIG. 6 is a longitudinal cross-section through a piston sealing arrangement according to the present invention, FIG. 7 is a view similar to FIG. 5, but showing a plurality of tandem seals in series, and FIG. 8 is a further view similar to FIG. 5 of a further embodiment of sealing arrangement.

FIG. 1 shows guide rings 1, 1a, 1b and 1c with their grooves 2, 2a, 2b and 2c arranged serially on a piston 7 or the like in such a way that each guide ring, by itself, absorbs the thrust forces and covers the entire guiding surface. The rings abut axially upon each other and provide a continuous, imperforate surface 8 with respect to the cylinder or the like (now shown).

Each guide ring is of 'U'-shaped cross-section, the U-section having a large axial width, the ratio of which to radial depth being approximately 4 : 1.

FIG. 2 shows a single or multiple seal 3 or 3a disposed respectively, between two guide rings 1 and 1a, and 1a and 1b. These multiple or single seals are of known construction for withstanding high pressures and need not be explained in detail as they are well-known in the art. The end faces 9, 9a and 10 of the guide rings 1, 1a and 1b absorb the bearing forces of the seals 3 and 3a The radial depth a of the U-shaped cross-section of the rings has a slightly larger tolerance than the corresponding radially extending projection or rib 4 of a piston 11 or the like and this ensures that the surfaces 5 and 6 of the ring bear on the piston 11. This feature results in the above-mentioned advantages.

FIG. 3 shows a guide ring 12 provided with an outwardly facing chamfer 17, the ring being so dimensioned that a prestress towards a piston rod 18 is obtained after installation of the ring. This has the advantage that the ring functions as a stripper lip in the region of the chamfer 17 so that dirt and ice can thus be stripped off by the outer ring 12.

The right-hand side of FIG. 3 shows the provision of a further guide ring 1a a tandem ring seal is disposed between the two rings 12 and 1a. The tandem ring seal comprises an outer ring seal 13, 13a with a seal lip 14, 14a and an inner sliding ring seal 15, 15a, formed for example, of an abrasion-resistant PTFE-bronze compound with a seal edge 19, 19a. The seal lip 14, 14a is dimensioned so that it projects beyond the nominal thickness of the seal when it is not installed so that it bears with prestress on the piston rod 18 when it is installed. Adequate sealing is thus obtained even in the unpressurized state. When subjected to pressure the outer ring seal 13, 13a is deformed so that as the pressure increases the seal lip 14, 14a increasingly thrust against the piston rod 18 or the plunger piston. The pressure direction is indicated by the arrow 16.

The inner sliding ring 15, 15a is surrounded by the outer ring seal 13, 13a and is in direct contact with the axially moving piston rod 18. As the pressure increases and compression of the ring seal 13, 13a likewise increases, it is mainly the sliding ring 15, 15a which is thrust upon the piston rod. The seal edge 19, 19a produces a chamber 20 which collects the drag oil, as will be explained hereinafter, that has passed by the seal lip 14, 14a. This oil is stripped off and retained by the seal edge 19, 19a so that the emerging piston rod is practically dry. When the piston rod returns the drag oil is returned into the cylinder.

This provides inter alia a further advantage in that the groove into which the guide ring is inserted can be produced in such a way that machining is confined to only one external register on which the guide ring bears.

The serial arrangement of a plurality of rings of 'U'-shaped cross-section covers the surface for guiding in such a way that metallic contact with the piston rod or the cylinder wall is prevented. Seals of different construction can be supported on both members of the U-shaped whose thickness can be arranged as desired.

FIG. 4 shows another embodiment. In this case the two guide rings 22 and 23, which can be constructed of plastics material, are on a piston 21. Despite its good wear resistance this plastics material has a specific resilience. The two rings 22 and 23 are slotted and can therefore snap on their seat 53 illustrated in the drawing, such seat having a radial relief 24 or a groove. Installation is thus greatly simplified and axial displacement of the two guide rings 22 and 23 is prevented.

A ring of resilient material 25 with sloping surfaces 26 and 27, shown in black, is positioned radially inward of the rings 22 and 23, the surfaces being biased by two rings 28 and 29 either through screws 30, 30a or by a pressure medium which is able to enter through bores 31, 31a.

The prestress of the resilient ring also biases a ring seal 32 which can be made exceptionally thin. Its axial thickness could be, for example, 1–2 mm for a cylinder diameter of approximately 100 mm. The installation space for the ring seal 32 is defined by the above-mentioned axial method of securing the guide rings 22 and 23, so that no pumping is possible through axial motion. Since the guide rings 22, 23 and ring seal 32 are simultaneously pre-stressed it is not possible for gaps to appear at any time during operation.

The method of operation is such that during the operating stroke the pressure medium is conducted through the bores 31, 31a onto the sloping surfaces 26, 27 via the rings 28, 29 so that the ring 25 is biased by a component which acts in the direction towards the cylinder surface. In the case of a single-acting piston in which no pressure medium acts on the piston rod side of the cylinder, it is necessary for this biasing operation to be performed on the right-hand side by the screw 30a which acts on the sloping surface 33 via the ring 29.

Due to pressure being applied to the two sloping surfaces 26 and 27 the pressure is reversed by the resilient ring 25, upwardly in the Figure, so that all rings 22, 23 and 25 are prestressed upwardly towards the cylinder surface which is not shown. It is also possible to arrange that biasing is obtained from both sides only by the pressure medium or on both sides only by screws. If biasing is obtained solely by the pressure medium it is also possible to omit the ring or rings 28 and/or 29 and the angle of the sloping surfaces 26, 27 can be adapted to requirements with respect to the cylinder running surface, i.e., it can be adapted in first place to the pressure level.

It is also particularly advantageous to thrust the rings 22, 23 radially outwardly upon the cylinder wall or around the piston rod by mechanical prestressing, or by the pressure medium acting through the resilient ring 25 so that the seal edge of the sliding ring cannot be pressed into a radial gap.

To this end it is particularly advantageous that the piston is centered by mechanical readjustment of the screws 30, 30a or by biasing of the pressure medium via the ring 25 so as to ensure that a precise central position is obtained at all times.

The invention also offers the advantage of being suitable for cylinder tubes or piston rods having a pronounced surface texture.

The ring 25 of resilient material therefore does not contact the running surface which is not shown and is therefore not subjected to any wear. The purpose of the ring is merely to transmit the applied pressure to all rings to which end it is provided with the above-mentioned sloping surfaces 26 and 27 which produce a wedge effect and direct the pressure in the desired direction.

Guide rings and ring seals pressed into position as described above bridge small porous areas without sustaining damage. To this end it is particularly advantageous that all rings in contact with the cylinder wall are constructed of a plastics material which has the property of sealing small porous places in the cylinder tube or in the piston rods. The use of a plastics material of the PTFE kind is particularly suitable to this end since it seals and smooths small porous places to produce an imperforate surface which is rendered mirror bright by the reciprocating motion of the piston and of the piston rods.

The important feature is that this enables the need for precision machining of cylinder tubes and piston rods to be substantially reduced and thus achieve more economical manufacture of such components. On the other hand, it is also possible to substantially reduce the reject rate by comparison to the prior art. For example, if the interior of a cylinder tube of 10 mm length is to be fine-machine, this will call for a working time of approximately five hours if a surface texture of a few tenths of a millimeter is to be converted into hundredths of a millimeter, given a mean diameter of 150 mm. However, if the surface texture of a few hundredths of a millimeter is to be converted into a few thousandths of a millimeter a similar number of working hours will again be required.

By using the subject of the invention it is possible to regard surface textures of the cylinder tube and of the piston rod amounting to a few hundredths of a millimeter as usable running surfaces. This achieves an important economical advantage in the machining of cylinder tubes and piston rods.

In addition, there is the advantage that geometrically non-circular profiles can be sealed by applying pressure according to the invention to the radially slightly deformable plastics guide rings and ring seals.

The simultaneous radial pressure applied by the two guide rings and by the ring seal against an imperforate bearing surface also provides the fundamental advantage of preventing the ring seal entering into a gap between the seal surfaces of the piston guide and rod guide. Reliable sealing is thus obtained despite the very low wear.

The ring seal 32 can be relatively thin, for example it can have an axial thickness of only 1–2 mm for a diameter of 100 mm. In this way it is possible to ensure that the seal rings are constantly readjusted in accordance with this important feature of the invention.

FIG. 5 shows a casing 34 in which a seal element 36 is positioned in a groove 35. The ring seal 36 surrounds a piston rod 37. The ring seal 36 is constructed in known manner of a soft resilient material such as plastics, rubber or the like and is provided with two seal lips 39 and 40 between which a shaped sliding ring 46 of abrasion-resistant, easy-sliding plastics is embedded. The plastics material has excellent wear resistance, a high degree of resilience and very low adhesion. It is conically shaped at the external end face edges, i.e. the end face edges form an obtuse angle with the surface 38 of the piston rod 37. This achieves accurate and reinforced contact with the surface 38 when pressure is applied.

According to the invention, the two seal lips and stripper lips 38 and 39 must be in contact with the seal surface 38 and the dimensions of the ring seal 36 are selected so that this is installed under prestress to come into contact with the sliding surface 38.

According to FIG. 6, two tandem seals 36 are disposed axially with respect to each other in a casing 43. However, in this arrangement the two separate tandem seals 36 are arranged so that the seal lips 40 are directed outwardly. This arrangement is intended for motion in both axial directions. Shoulder portions 44, 45 of the casing 43 are disposed forwardly of the seal lips 40 in order to ensure reliable operation thereof. This step ensures that no excessive pressure surge is able to act on the seal lips 40. It is also preferred that the ring seals 36 are prestressed radially towards the seal surface 38 with respect to the shaped sliding rings 46. This produces increased prestress apart from the stress applied by the seal lip 40. On the one hand, this covers the static sealing zone and ensures that the sliding ring is thrust sufficiently onto the sliding surface even when used at low pressure or in an unpressurized state. In this case the shaped sliding ring 46 is increasingly thrust upon the sliding surface via the curved back 47 due to the axial compression of the ring seal 36.

FIG. 7 shows an embodiment in which a plurality of such seals are arranged axially in series in a common groove 48 of a casing 49. As can be seen, the seal lips 40 are arranged for pressure from only one axial direction. Even a few drops of oil can result in substantial damage in piston seals for the foodstuffs, paper and textile industry. Multiple safety must therefore be incorporated.

FIG. 8 shows an embodiment in which the shaped sliding ring 46 is provided with a chamber 42, defined by the surface 38 which is to be sealed, the chamber 42 being adapted to receive drag oil. As can be seen, the drag oil chamber is also provided in the region of the seal lip 40 and extends approximately to that edge of the seal lip 40 which is in contact with the sliding surface 38 to be sealed. The stripper edge 50 is positioned in the mid-circumferential plane of the groove and is perpendicular with respect to the surface 38 for sealing and is therefore sharp-edged. Wear on the edge 50 is exceptionally low due to the properties of the above-mentioned abrasion-resistant low wear "PTFE" material and the edge 50 is therefore well suited to strip off drag oil from the surface 38. During the return stroke the oil stored in the drag oil chamber 42 is again applied to the surface 38 and returns into the interior of the cylinder.

FIG. 8 also shows chamfered end faces 51 and 52 of the shaped sliding ring 46. The surfaces 51 and 52 therefore form an obtuse angle with the surface 38 which is to be sealed. These surfaces contribute to the radial deflection towards the seal surface 38 of the pressure which acts axially on the resilient ring seals 36, i.e. the shaped sliding ring 46 is biased by the resilient material and is increasingly compressed around the piston rod.

In the course of the assembling operation the shaped sliding ring 46 can be easily inserted into the ring seal 36 so that installation and exchange of the shaped sliding ring 46 can be performed with exceptional ease.

Since the shaped sliding ring is able to bridge fine pores in operation, it is possible to minimize precision machining of the sliding surfaces 38 of cylinder tubes and piston rods thus improving the economical manufacture of such components. Furthermore, the reject rate hitherto encountered can be substantially reduced. Surface textures in a tube or on a piston rod amounting to a few hundredths of a millimeter can be regarded as usable running surfaces if the subject of the invention is utilized.

This also offers the advantage that geometrically non-circular profiles can be effectively sealed by pressing the radially readily deformable shaped sliding rings 46 onto such profiles.

Due to the construction of the second, sharp seal edge the above-mentioned drag oil chamber 42 is disposed intermediately because the first seal lip substantially performs the sealing operation. Due to the invention the drag oil is stripped off the above-mentioned approximately vertical edge 50 and is collected in the drag oil chamber 42 during the outward motion of the piston rod. During the inward motion, the oil in the drag oil chamber 42 is again applied as drag oil onto the surface which is to be sealed and is thus entrained into the interior of the cylinder. Test series of this embodiment have shown complete and reliable sealing-tightness.

I claim:

1. An axially movable member such as a piston or piston rod in combination with a guide and sealing arrangement, comprising at least two guide rings positioned in series in the axial direction thereof and disposed in spaced relation, said guide rings being formed of a resilient material having a first radially facing surface an oppositely directed second radially facing surface and a pair of radially extending surfaces extending in the direction between said first and second radially facing surfaces, a ring seal positioned between and in engagement with one radially extending surface on each of said guide rings, said ring seal having an operative position for providing a sealing arrangement, said ring seal having a first radially facing surface facing in the same direction as the first radially facing surface of said guide rings an oppositely directed second radially facing surface and a pair of radially extending surfaces with each of said radially extending surfaces contacting a radially extending surface on one of said guide rings, means for biasing the first radially facing surface of said ring seal into the operative position, said means including a ring of resilient material having a first radially facing surface facing in the same direction as the first radially facing surface of said guide rings and ring seal, the first radially facing surface of said ring of resilient material disposed in contact with the second radially facing surfaces of said guide rings and ring seal and being spaced in the radial direction from the first radially facing surfaces of said guide rings and said ring seal, said ring of resilient material having side edges extending transversely of the first radially facing surface thereof and said side edges tapering inwardly toward one another as they extend away from the first radially facing surface thereof, and a separate biasing member in contact with each of said tapering side edges for transmitting a biasing action to and through said ring of resilient material to said ring seal for biasing the first radially facing surface of said ring seal into the operative position.

2. An axially movable member, as set forth in claim 1, wherein said guide rings and said ring seal being formed of plastics material having the property of covering small porous areas in a surface relative to which movement takes place between said guide rings and said ring seal, without being impressed into the porous areas.

3. An axially movable member, as set forth in claim 1, wherein said guide rings and said ring seal being formed of easily deformable plastics material when used for cylinders with a geometrically non-circular profile.

4. An axially movable member, as set forth in claim 1, wherein said biasing member comprises a ring having a frusto-conical surface mating with the tapered side edges of said ring of resilient material, and a plurality of screws extending in the axial direction of said ring seal and disposed in contact with said ring having the frusto-conical surface to provide a desired stress to and through said ring of resilient material to said ring seal.

5. An axially movable member, as set forth in claim 1, including said means for biasing including means forming a bore opening to said biasing member on the side thereof remote from said tapering side edges of said ring, said means forming the bore also forming a fluid pressure chamber in communication with the bore for supplying pressure to said biasing member for transmission therethrough to said ring of resilient material.

6. An axially movable member, as set forth in claim 1, wherein the second radially facing surface of each said guide ring comprising an annular groove, and said axially movable member having a projection arranged to seat into said groove.

7. A sealing arrangement, more particularly for use with hydraulically operated cylinder pistons or piston rods, said sealing arrangement comprising a surface to be sealed, a support member disposed opposite said surface, said support member having a groove therein opening toward said surface to be sealed, at least one ring seal fitted into said groove and formed of a soft material, said ring seal comprising a body spaced from said surface to be sealed and said body having a seal lip extending outwardly therefrom into contact with said surface to be sealed, said seal lip having at least one surface extending transversely of said surface to be sealed which is disposed at an oblique angle to said surface to be sealed, said ring seal having an annular groove therein in the surface thereof facing toward the surface to be sealed, a sliding ring of abrasion-resistant material seated in the annular groove in said ring seal and positioned in contact with said seal lip, said sliding ring disposed in bearing contact with the surface to be sealed and having side surfaces extending radially from and transversely of said surface to be sealed with said side surfaces converging toward one another as they extend away from said surface to be sealed.

8. A sealing arrangement, as set forth in claim 7, wherein the surface of said sliding ring and the adjacent surface of said ring seal including said seal lip thereon forming in combination with said surface to be sealed a chamber for receiving drag oil.

9. A sealing arrangement, as set forth in claim 8, wherein said seal lip is located along one edge of said ring seal and said drag oil chamber located between said seal lip and said sliding ring.

10. A sealing arrangement, as set forth in claim 8, wherein said sliding ring having a portion of one of said side surfaces thereof extending approximately perpendicularly of the surface to be sealed and forming one side of said drag oil chamber spaced in the axial direction of said sliding seal from said seal lip.

11. A sealing arrangement, as set forth in claim 7, wherein the surface of said sliding ring facing oppositely from the surface to be sealed having a concave configuration.

12. A sealing arrangement, as set forth in claim 7, including means for radially prestressing said ring seal on the surface to be sealed relative to said sliding ring.

13. A sealing arrangement, as set forth in claim 7, wherein said sliding ring being relatively thin and having a radial thickness thereof adapted to the diameter.

14. A sealing arrangement, as set forth in claim 7, wherein said ring seal being dimensioned so that it is progressively thrust into contact with the surface to be sealed when subjected to high pressure.

15. A sealing arrangement, as set forth in claim 7, wherein said support member having shoulder parts projecting toward said surface to be sealed and said shoulder parts spaced axially from and adjacent to said seal lips.

* * * * *